US012752698B2

(12) United States Patent
Chiba et al.

(10) Patent No.: US 12,752,698 B2
(45) Date of Patent: Oct. 6, 2026

(54) AUTOMATIC TRAVEL MANAGEMENT DEVICE

(71) Applicant: TOYOTA JIDOSHA KABUSHIKI KAISHA, Toyota (JP)

(72) Inventors: Hiroya Chiba, Fuji (JP); Rika Oike, Shizuoka (JP); Tatsuya Sugano, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 19/018,028

(22) Filed: Jan. 13, 2025

(65) Prior Publication Data

US 2025/0229701 A1 Jul. 17, 2025

(30) Foreign Application Priority Data

Jan. 16, 2024 (JP) ................................ 2024-004772

(51) Int. Cl.
*B60Q 1/14* (2006.01)
*G06V 20/52* (2022.01)
*G06V 40/10* (2022.01)

(52) U.S. Cl.
CPC ............ *B60Q 1/143* (2013.01); *G06V 20/52* (2022.01); *G06V 40/10* (2022.01); *B60Q 2800/10* (2022.05)

(58) Field of Classification Search
CPC .... B60Q 1/143; B60Q 2800/10; G06V 20/52; G06V 40/10
See application file for complete search history.

(56) References Cited

U.S. PATENT DOCUMENTS

2014/0062685 A1* 3/2014 Tamatsu ................ G08G 1/005 340/425.5
2020/0074859 A1* 3/2020 Eshima ................ B60W 30/06
2022/0363245 A1* 11/2022 Imazu .................... G06V 20/56
(Continued)

FOREIGN PATENT DOCUMENTS

JP 2012-030613 A 2/2012
JP 2019108101 A * 7/2019
(Continued)

OTHER PUBLICATIONS

English translation of Hsu JP-2019108101-A (Year: 2019).*

*Primary Examiner* — Evan P Dzierzynski
(74) *Attorney, Agent, or Firm* — Dinsmore & Shohl LLP

(57) ABSTRACT

An automatic travel management device is configured to manage automatic travel of a vehicle in a designated area. The automatic travel management device includes a communication device and one or more processors. The communication device is configured to communicate with each of the vehicle and a recognition sensor. The recognition sensor is installed in the designated area and configured to recognize a situation in the designated area. The one or more processors are configured to: when the vehicle is automatically traveling while a headlight of the vehicle is turned on, detect a first person present in an illumination range of the headlight based on person recognition information from the recognition sensor; and, in response to detection of the first person, execute a light amount reduction process of transmitting, to the vehicle, an instruction to reduce light amount of the headlight.

5 Claims, 6 Drawing Sheets

(56) References Cited

U.S. PATENT DOCUMENTS

| | | | | |
|---|---|---|---|---|
| 2023/0142657 | A1 | 5/2023 | Wada et al. | |
| 2023/0186593 | A1 * | 6/2023 | Tryndin | G06V 10/60 315/82 |
| 2023/0211722 | A1 * | 7/2023 | Li | B60Q 1/076 315/82 |

FOREIGN PATENT DOCUMENTS

| | | | |
|---|---|---|---|
| JP | 2020-032872 | A | 3/2020 |
| JP | 2022-175719 | A | 11/2022 |
| JP | 7302743 | B2 | 7/2023 |

* cited by examiner

AUTOMATIC TRAVEL MANAGEMENT DEVICE

CROSS-REFERENCES TO RELATED APPLICATION

The present disclosure claims priority under 35 U.S.C. § 119 to Japanese Patent Application No. 2024-004772, filed on Jan. 16, 2024, which is incorporated herein by reference in its entirety.

BACKGROUND

Technical Field

The present disclosure relates to a technique for managing automatic travel of a vehicle in a designated area.

Background Art

JP 2022-175719 A discloses an automatic parking server. The automatic parking server sets an illuminance reduction point (i.e., a position in a parking lot at which the illuminance of front lights of an automated driving vehicle is reduced), and instructs the automated driving vehicle to reduce the illuminance at the illuminance reduction point. A position before entering a pick-up area or a position in the pick-up area is disclosed as an example of setting the illuminance reduction point.

Moreover, JP 7302743 B2 discloses an electrical component control device configured to control an operating state of at least one electrical component mounted on an automated driving vehicle. The electrical component control device is configured to reduce the operation of a plurality of target electrical components corresponding to electrical components that affect the five senses of a user when the automated driving vehicle is instructed to move in response to a movement request for moving the automated driving vehicle without the user in the automated driving vehicle. Furthermore, JP 2019-108101 A discloses a control device for a vehicle that makes it easy for a driver to visually recognize a pedestrian located between the vehicle and an oncoming vehicle while ensuring illuminance ahead of the vehicle as much as possible when headlights of the vehicle are turned on. When the illuminance in a designated light projection range where a light projection range of the headlights of the vehicle (i.e., subject vehicle) and a light projection range of headlights of the oncoming vehicle overlap with each other is equal to or greater than a designated value and a pedestrian is detected in the designated light projection range, the control device automatically reduces the illuminance of the headlights of the subject vehicle in the designated light projection range.

SUMMARY

Lighting of a lighting device, such as headlights, is basically desirable because the lighting can inform people around a vehicle (for example, pedestrian, and person on another vehicle) of the presence of the vehicle. However, when the vehicle turns on the headlights in a dark designated area, such as a parking lot or a factory area, the vehicle may dazzle a person in the designated area. According to the technique described in JP 2022-175719 A, the illuminance is reduced when it is determined that the automated driving vehicle has reached the illuminance reduction point based on parking lot map information. However, a person, such as a user, may not always be present in the pick-up area when the automated driving vehicle reaches the pick-up area as the illuminance reduction point. Therefore, according to the technique described in JP 2022-175719 A, the illuminance of the headlights may be unnecessarily reduced.

The present disclosure has been made in view of the problem described above, and an object of the present disclosure is to reduce glare to a person present in a designated area due to light emitted from a headlight while reducing an unnecessary reduction in the light amount of the headlight.

An automatic travel management device according to the present disclosure is configured to manage automatic travel of a vehicle in a designated area. The automatic travel management device includes a communication device and one or more processors. The communication device is configured to communicate with each of the vehicle and a recognition sensor. The recognition sensor is installed in the designated area and configured to recognize a situation in the designated area. The one or more processors are configured to: when the vehicle is automatically traveling while a headlight of the vehicle is turned on, detect a first person present in an illumination range of the headlight based on person recognition information from the recognition sensor; and, in response to detection of the first person, execute a light amount reduction process of transmitting, to the vehicle, an instruction to reduce light amount of the headlight.

According to the present disclosure, a person present in the illumination range of the headlight of the vehicle that is automatically traveling is detected based on the person recognition information from the recognition sensor installed in the designated area. Then, in response to the detection of the person, the instruction to reduce the light amount of the headlight is transmitted to the vehicle. This makes it possible to reduce glare to the person present in the designated area due to the light emitted from the headlight while reducing an unnecessary reduction in the light amount (including an unnecessary turn-off of the headlight).

DETAILED DESCRIPTION

Embodiments of the present disclosure will be described with reference to the accompanying drawings.

1. Automatic Travel Management System

Figure 1:
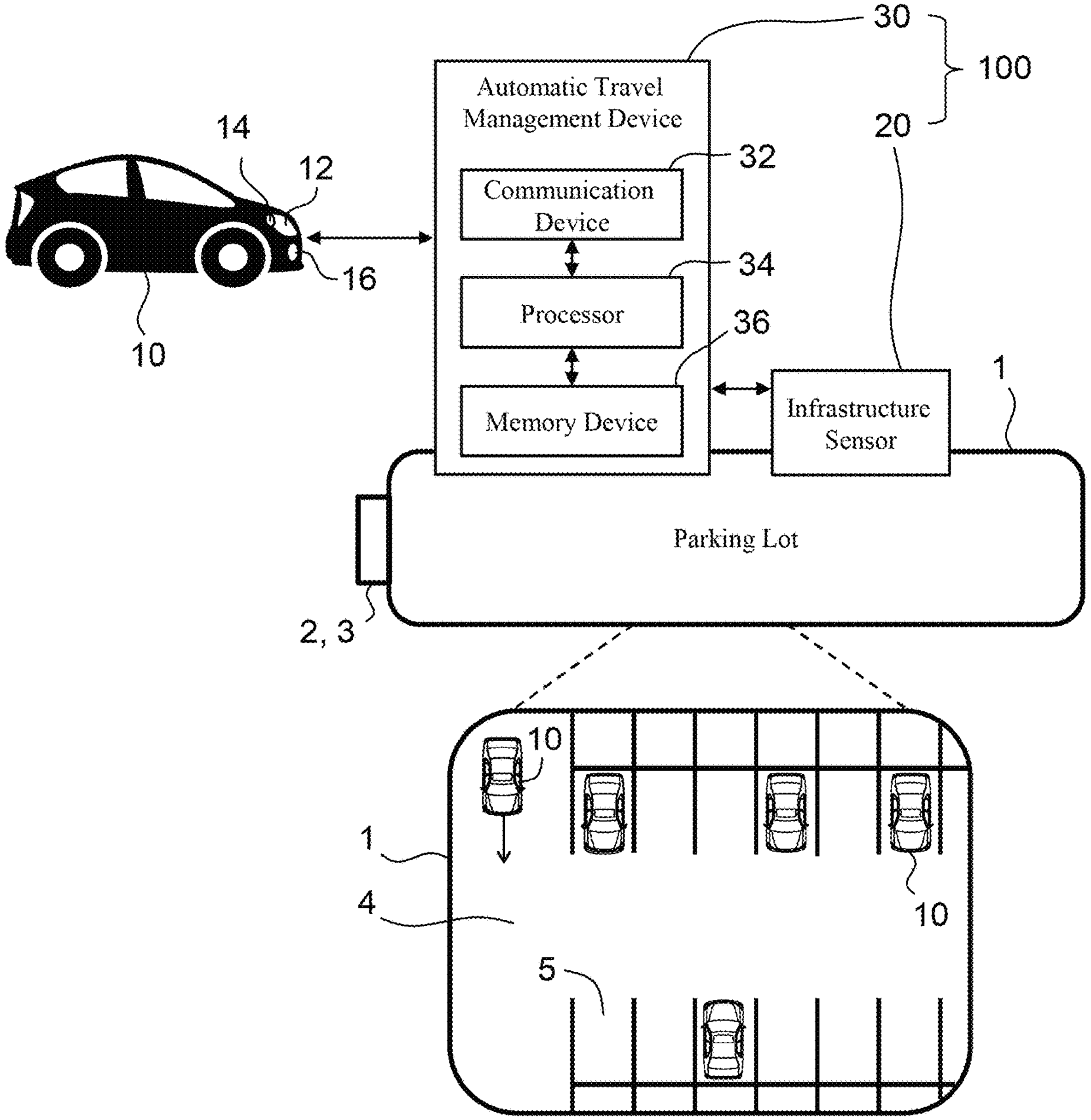
FIG. 1 is a diagram schematically showing an example of a configuration of an automatic travel management system according to an embodiment.

FIG. 1 is a diagram schematically showing an example of a configuration of an automatic travel management system 100 according to an embodiment. The automatic travel management system 100 is configured to manage automatic travel of a vehicle 10 in a "designated area". In an example shown in FIG. 1, the designated area is a parking lot 1. More specifically, in this example, the automatic travel management system 100 corresponds to an automatic valet parking management system configured to manage automatic valet parking (AVP) of the vehicle 10 in the parking lot 1. It should be noted that the designated area is not limited to the parking lot 1, and may be, for example, an area in a factory. The following description will be made by taking the parking lot 1 as an example of the designated area.

The vehicle 10 is adapted to the AVP in the parking lot 1. The vehicle 10 can travel at least in the parking lot 1 automatically independently of a driving operation by a driver. The vehicle 10 may be an automated driving vehicle that can automatically travel even outside the parking lot 1. The vehicle 10 includes headlights (i.e., front lights) 12 and clearance lights (side marker lights) 14. The vehicle 10 may also include daytime running lights 16.

The parking lot 1 includes a drop-off area 2, a pick-up area 3, a passage 4, and a plurality of parking spaces 5. The vehicle 10 that enters the parking lot 1 stops at the drop-off area 2, and a user gets off the vehicle 10 there. On the other hand, the vehicle 10 that exits the parking lot 1 stops in the pick-up area 3, and the user gets on the vehicle 10 there. The drop-off area 2 may be referred to as an entry area, and the pick-up area 3 may be referred to as an exit area. The passage 4 is an area where the vehicle 10 travels. The parking space 5 is a space in which the vehicle 10 is parked. For example, the parking space 5 is partitioned by a partition line. It should be noted that the parking lot 1 may be a parking lot dedicated to the AVP for only AVP vehicles 10 or may be a parking lot available for AVP vehicles 10 that do not use the AVP function and vehicles that do not have the AVP function.

As illustrated in FIG. 1, the automatic travel management system 100 includes one or more infrastructure sensors 20 (hereinafter, simply referred to as an infrastructure sensor 20) and an automatic travel management device (or simply referred to as a management device) 30.

The infrastructure sensors 20 are installed at various locations in the parking lot 1 and configured to recognize the situation in the parking lot 1. The infrastructure sensor 20 includes, for example, a camera. More specifically, the infrastructure sensor 20 recognizes a situation around the vehicle 10 in the parking lot 1 (for example, obstacles such as a pedestrian and another vehicle). The infrastructure sensor 20 also recognizes the availability of the parking space 5. The information acquired by the infrastructure sensor 20 is transmitted to the automatic travel management device 30. In addition, the infrastructure sensor 20 corresponds to an example of a "recognition sensor" according to the present disclosure.

The automatic travel management device 30 is configured to manage the automatic travel of the vehicle 10 in the parking lot 1 (i.e., the designated area). The management device 30 is installed in the parking lot 1, for example. Alternatively, the management device 30 may be, for example, a management server (i.e., cloud) configured to manage a plurality of parking lots 1. Alternatively, the management device 30 may be a combination of a local management device installed in the parking lot 1 and the management server.

The management device 30 includes a communication device 32, one or more processors 34 (hereinafter, simply referred to as a processor 34), and one or more memory devices 36 (hereinafter, simply referred to as a memory device 36). The communication device 32 is configured to communicate with each of the vehicle 10 and the infrastructure sensor 20 via a communication network.

The processor 34 is configured to execute various processes related to management of the automatic travel of the vehicle 10. Examples of the processor 34 include a central processing unit (CPU), a graphics processing unit (GPU), an application specific integrated circuit (ASIC), a field-programmable gate array (FPGA), or any combination thereof. The processor 34 may also be referred to as circuitry or processing circuitry. The circuitry may be hardware programmed to perform the functions described or hardware that performs the functions. The memory device 36 stores various kinds of information. The memory device 36 includes a volatile memory, a nonvolatile memory, a hard disk drive (HDD), a solid state drive (SSD), or any combination thereof. The processor 34 executing a management program and the memory device 36 may cooperate with each other to implement the functions of the management device 30. The management program is stored in the memory device 36. Alternatively, the management program may be recorded in a non-transitory computer-readable recording medium. The management program may be provided via a network.

The management device 30 (processor 34) is configured to execute automatic travel control for causing the vehicle 10 to automatically travel in the parking lot 1, based on the information from the infrastructure sensors 20. More specifically, in an example in which the designated area is the parking lot 1, control of the vehicle 10 for automatically parking the vehicle 10 in the parking space 5 allocated to the vehicle 10 corresponds to the automatic travel control described here.

In the automatic travel control, the management device 30 acquires information indicating the situation around the vehicle 10 in the parking lot 1 (for example, obstacles such as a pedestrian and another vehicle) from the infrastructure sensor 20. The information includes "person recognition information" described below. Also, the management device 30 specifies the position of the vehicle 10 in the parking lot 1 based on the information of the vehicle 10 recognized by the infrastructure sensor 20. The management device 30 generates a target travel route from the drop-off area (i.e., the entry area) 2 to the parking space 5 allocated to the vehicle 10 based on these kinds of information. Then, the management device 30 communicates with the vehicle 10 and remotely controls the vehicle 10 such that the vehicle 10 travels along the generated target travel route.

2. Lighting Control in Designated Area

The automatic travel management device 30 (processor 34) is configured to control the lights of the vehicle 10 that is automatically traveling in the designated area as follows.

2-1. First Control Example

Figure 2:
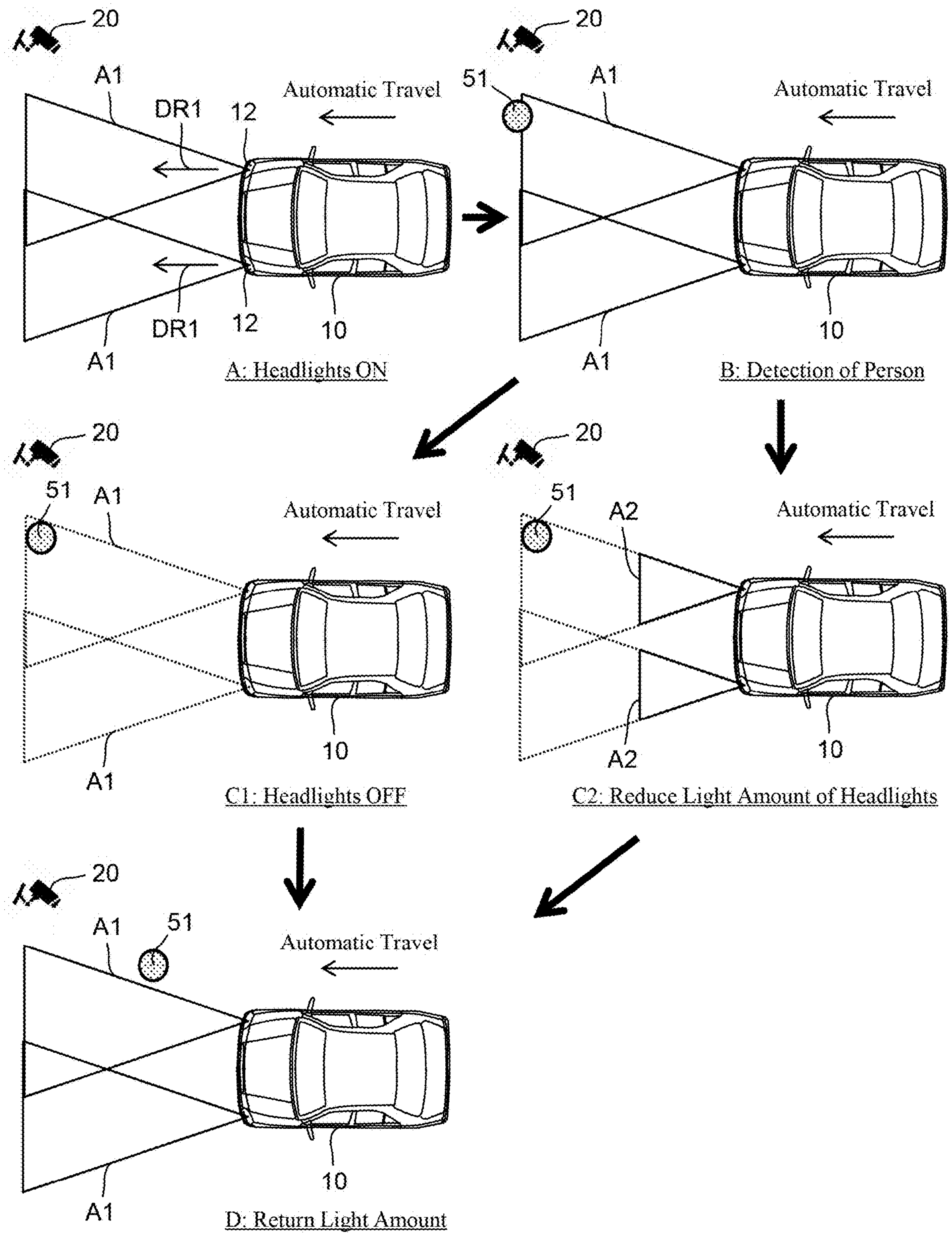
FIG. 2 is a diagram used to describe a first control example of lights of a vehicle in a designated area according to an embodiment.

FIG. 2 is a diagram used to describe a first control example of the lights of the vehicle 10 in the designated area according to the embodiment.

FIG. 2 shows an example of an illumination range (i.e., irradiation range) A1 of the left and right headlights 12 of the vehicle 10. The illumination range A1 extends forward from the vehicle 10 along an illumination direction DR1 in, for example, a substantially conical shape. In FIG. 2, the illumination ranges A1 of the left and right headlights 12 are shown in the same size as an example. However, the illumination range A1 may be different between the left and right. For example, each of the illumination ranges A1 may be specified two dimensionally in a top view of the vehicle 10 as shown in FIG. 2. Alternatively, each of the illumination ranges A1 may be a spatial range (i.e., illumination space) specified three dimensionally.

Prior to the start of the automatic travel control of the vehicle 10, the management device 30 communicates with the vehicle 10 and acquires "illumination range information". The acquired illumination range information is stored in the memory device 36. The illumination range information includes, for example, the position of the headlight 12 on the vehicle 10, and the illumination angle and the illumination distance of the headlight 12. The management device 30 can determine the illumination range A1 of each headlight 12 based on the illumination range information.

When the vehicle 10 performs the automatic travel in a dark designated area, such as an indoor parking lot 1, the management device 30 transmits to the vehicle 10 an instruction to turn on the headlights 12 with a normal light amount. An electronic control unit (ECU) of the vehicle 10 that has received the instruction turns on the headlights 12 with the normal light amount as shown in FIG. 2 (A: Headlights On).

The infrastructure sensors 20 installed at various places in the parking lot 1 are configured to capture images of respective parts of the parking lot 1 and analyze the captured images to execute a process of recognizing a person in the parking lot 1. The person targeted for the recognition includes, for example, a pedestrian and a person on a vehicle. When recognizing a person, the infrastructure sensor 20 transmits "person recognition information" to the management device 30. The person recognition information includes information of an image of the parking lot 1 including the recognized person.

The management device 30 that has received the person recognition information when the vehicle 10 is performing the automatic travel while the headlights 12 are turned on executes the following processing. That is, the management device 30 performs a process of detecting a person ("first person" according to the present disclosure) present in the illumination range A1 of the headlights 12 of the vehicle 10 based on the person recognition information.

More specifically, the management device 30 identifies the position of the recognized person based on the person recognition information. Then, the management device 30 executes a process of detecting a person present in the illumination range A1 on the basis of, for example, the position information of the person, the position information of the vehicle 10 determined on the basis of the information from the infrastructure sensors 20, and the illumination range information. The illumination range A1 used for detecting a person in this way is, for example, the total range of the respective illumination ranges A1 of the left and right headlights 12. In addition, the detection of a person present in the illumination range A1 may not always need that the entire person is within the illumination range A1, and it is sufficient that at least a part of the person is within the illumination range A1.

When a pedestrian 51, which is an example of a person present in the illumination range A1, is detected (B: Detection of Person), the management device 30 executes a "light amount reduction process" in response to the detection of the pedestrian 51. The light amount reduction process includes transmitting to the vehicle 10 an instruction to reduce the light amount of the headlights 12 (light amount reduction instruction). The light amount reduction instruction may be an instruction to turn off the headlights 12. The vehicle 10 that has received the instruction to turn off the headlights 12 turns off the headlights 12 (C1: Headlights Off). In addition, the management device 30 may transmit to the vehicle 10 an instruction to turn off the clearance lights 14 in synchronization with the turn-off of the headlights 12, or may continue to turn on the clearance lights 14.

Alternatively, the light amount reduction instruction may be an instruction to reduce the light amount without turning off the headlights 12. The vehicle 10 that has received this instruction reduces the light amount of the headlights 12 in accordance with the instruction (C2: Reduce Light Amount of Headlights). An illumination range A2 corresponds to an example of the illumination range of the headlights 12 obtained when the light amount is reduced in this way.

In addition, when the light amount reduction instruction is an instruction to reduce the light amount, the management device 30 may transmit to the vehicle 10 an instruction to reduce the light amount as the detected person, such as the pedestrian 51, approaches the vehicle 10. Also, the instruction may eventually include turning off the headlights 12.

When the pedestrian 51 is detected to have moved out of the illumination range A1 during the execution of the light amount reduction process based on the person recognition information, the management device 30 transmits to the vehicle 10 an instruction to return the light amount of the headlights 12 to a light amount before the reduction by the light amount reduction process. The vehicle 10 that has received this instruction return the light amount of the headlights 12 in accordance with the instruction (D: Return Light Amount). In addition, in the example in which the headlights 12 are turned off by the light amount reduction process, the vehicle 10 turns on the headlights 12 again.

As described above, according to the first control example, a person present in the illumination range A1 of the headlights 12 of the vehicle 10 that is automatically traveling is detected based on the person recognition information from the infrastructure sensor 20 (recognition sensor) installed in the parking lot 1 (designated area). Then, in response to the detection of the person, the instruction to reduce the light amount of the headlights 12 is transmitted to the vehicle 10. This makes it possible to reduce glare to the person present in the parking lot 1 due to the light emitted from the headlights 12 while reducing an unnecessary reduction in the light amount (including an unnecessary turn-off of the headlights 12).

Moreover, according to the first control example, when it is detected that a person, such as the pedestrian 51, has moved out of the illumination range A1, the instruction to return the light amount of the headlights 12 to the light amount before the reduction by the light amount reduction process is transmitted to the vehicle 10. This makes it possible to reduce an unnecessary reduction in the light amount of the headlights 12 while realizing a function of reducing glare to the person present in the parking lot 1.

2-2. Second Control Example

Figure 3:
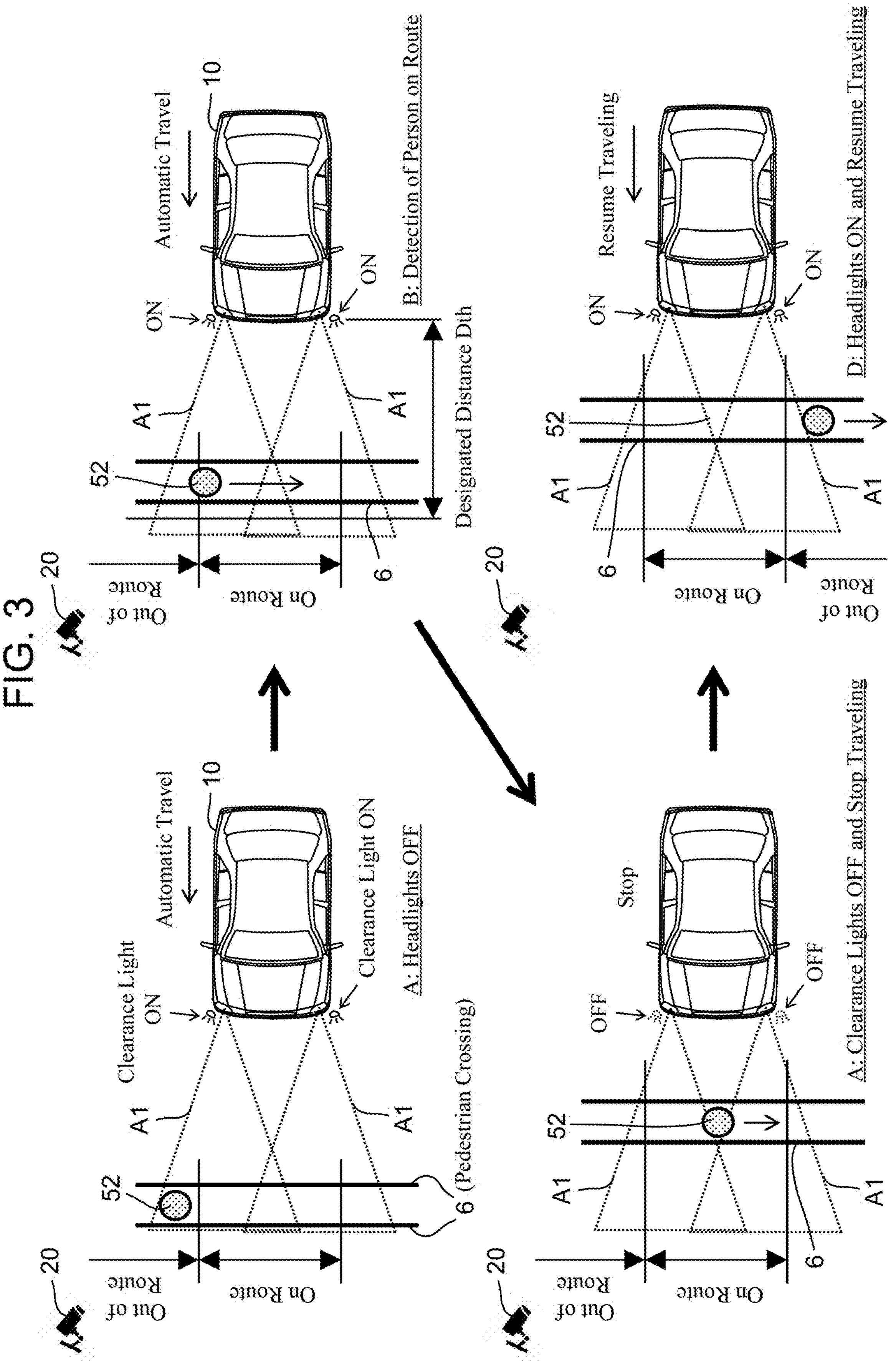
FIG. 3 is a diagram used to describe a second control example of lights of a vehicle in a designated area according to an embodiment.

The first control example described above may be performed with a second control example described below. FIG. 3 is a diagram used to describe the second control example of the lights of the vehicle 10 in the designated area according to the embodiment.

The second control example is based on the premise that the light amount reduction instruction to the vehicle 10 by the light amount reduction process is an instruction to turn off the headlights 12. Therefore, in response to the detection of the pedestrian 52, which is an example of a person present in the illumination range A1 of the headlights 12, the vehicle 10 is automatically traveling while the headlights 12 are turned off (A: Headlights Off). Also, in this example, the vehicle 10 turns on the clearance lights 14 while the headlights 12 are turned off. Thereafter, the pedestrian 52 moves along, for example, a pedestrian crossing 6 and enters a travel route (target travel route) of the vehicle 10, which is located ahead of the vehicle 10.

In the second control example, when the vehicle 10 is traveling while the headlights 12 are turned off in accordance with the light amount reduction process as described above and the clearance lights 14 are turned on, the management device 30 executes the following process. That is, the management device 30 executes a process of detecting a person (a "second person" according to the present disclosure) present on the travel route ahead of the vehicle 10 and within a designated distance Dth from the vehicle 10 on the basis of the person recognition information. In the example shown in FIG. 3, the pedestrian 52 described above is detected as a person who satisfies this detection condition (B: Detection of Person on Route).

In addition, the management device 30 is configured to communicate with the vehicle 10 in advance and acquire vehicle width information of the vehicle 10 in order to detect a person (second person), such as the pedestrian 52 or a person on another vehicle. Based on, for example, the person recognition information from the infrastructure sensor 20, the position information of the vehicle 10, and the vehicle width information, the management device 30 can detect that a person is present on the travel route ahead of the vehicle 10. Also, the designated distance Dth is determined in advance and stored in the memory device 36. Based on, for example, the person recognition information, the position information of the vehicle 10, and the designated distance Dth, the management device 30 can detect that a person is present within the designated distance Dth from the vehicle 10 ahead of the vehicle 10.

In response to detection of the pedestrian 52 present on the travel route and within the designated distance Dth, the management device 30 transmits to the vehicle 10 an instruction to turn off the clearance lights 14 and stop (more specifically, temporarily stop) the travel of the vehicle 10. The vehicle 10 that has received the instruction turns off the clearance lights 14 and stops the travel of the vehicle 10 (C: Clearance Lights OFF and Stop Traveling). In addition, the management device 30 may transmit to the vehicle 10 an instruction to turn off the daytime running lights 16 in synchronization with the turn-off of the clearance lights 14, or may continue to turn on the daytime running lights 16.

While the vehicle 10 is stopped, the management device 30 executes a process of detecting that the pedestrian 52 has moved out of the travel route, based on the person recognition information. In response to detection of the movement of the pedestrian 52 to the outside of the travel route, the management device 30 transmits to the vehicle 10 the instruction to turn on the headlights 12 and resume the travel of the vehicle 10. The vehicle 10 that has received the instruction turns on the headlights 12 and resumes the travel of the vehicle 10 (D: Headlights ON and Resume Traveling). The instruction may include turning on the clearance lights 14.

As described above, according to the second control example, when the vehicle 10 is traveling while the headlights 12 are turned off in accordance with the light amount reduction process and the clearance lights 14 are turned on, the instruction to turn off the clearance lights 14 and stop the travel of the vehicle 10 is transmitted to the vehicle 10 in response to the detection of a person, such as the pedestrian 52, present on the travel route and within the designated distance Dth. As a result, the glare to the detected person can be further reduced by turning off the clearance lights 14. In addition, by turning off the clearance lights 14, it is possible to inform the person that the vehicle 10 is in a state of stopping traveling in an easily understandable manner.

Furthermore, according to the second control example, in response to the detection of movement of a person, such as the pedestrian 52, to the outside of the travel route based on the person recognition information, the instruction to turn on the headlights 12 and resume the travel of the vehicle 10 is transmitted to the vehicle 10. As a result, it is possible to reduce an unnecessary reduction in the light amount of the headlights 12 while realizing a function of reducing glare to the person present in the parking lot 1.

2-3. Third Control Example

Figure 4:
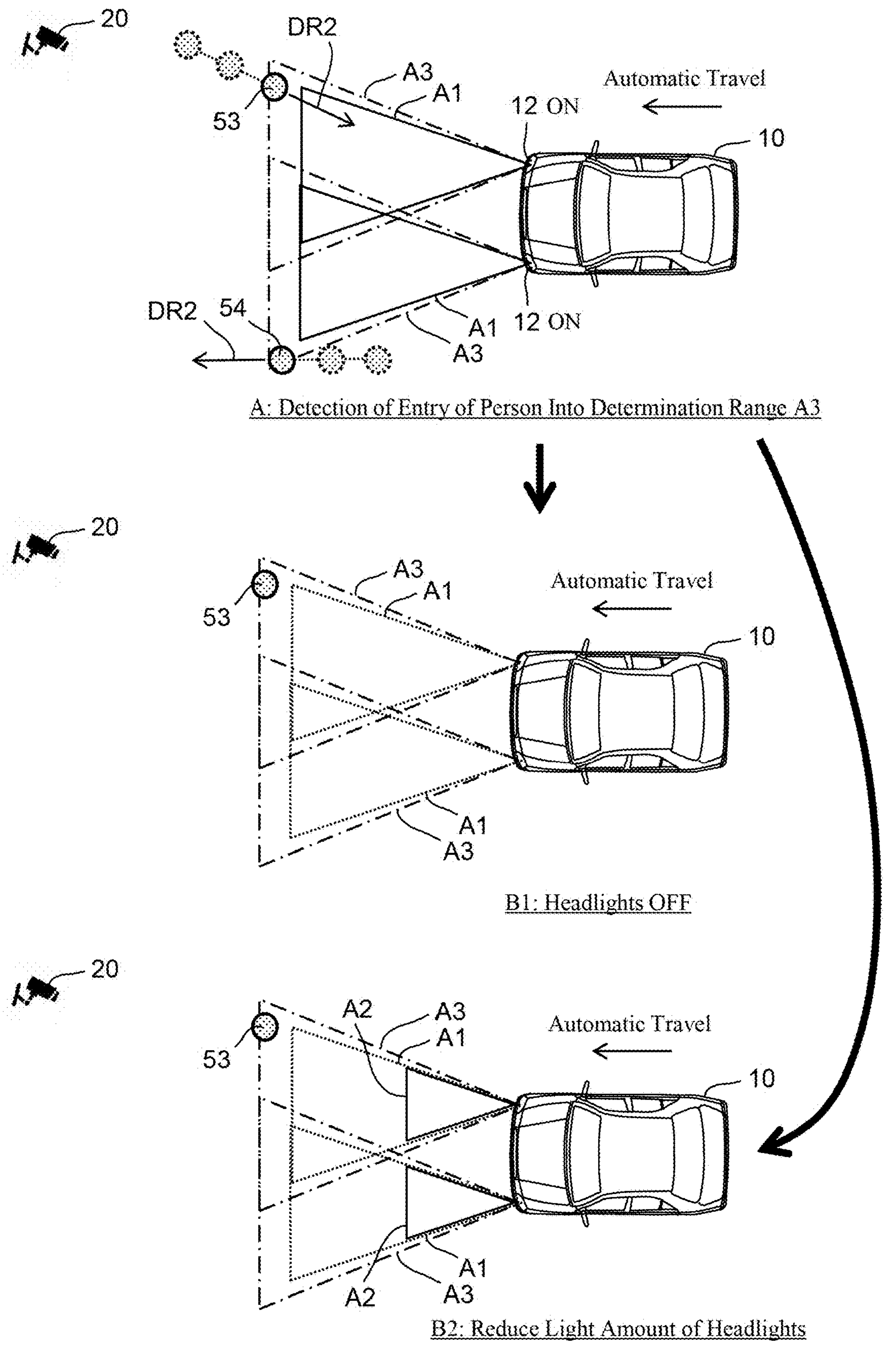
FIG. 4 is a diagram used to describe a third control example of lights of a vehicle in a designated area according to an embodiment.

The first control example described above may be executed with a third control example described below instead of the second control example or together with the second control example. FIG. 4 is a diagram used to describe the third control example of the lights of the vehicle 10 in the designated area according to the embodiment.

In the third control example, the "light amount reduction process" is executed not only in response to the detection of a person present in the illumination range A1, but also in response to detection of the following action. That is, when the vehicle 10 is automatically traveling while the headlights 12 are turned on, the management device 30 executes a process of estimating a moving direction DR2 (in other words, a predicted path) of a person (third person) moving in the parking lot 1 based on the person recognition information. For example, the management device 30 estimates (acquires) the moving direction DR2 by analyzing images captured by the infrastructure sensor 20.

When the estimated moving direction DR2 indicates that a person approaches the illumination range A1 (for example, a pedestrian 53 in FIG. 4), the management device 30 performs a process of detecting the entry of the person into a determination range A3 based on the person recognition information. As shown in FIG. 4, the determination range A3 is greater than the illumination range A1, and is determined in advance based on the illumination range A1. In the example shown in FIG. 4, the pedestrian 53 is detected as a person who satisfies this detection condition (A: Detection of Entry of Person Into Determination Range A3).

In response to detection of entry of the pedestrian 53 into the determination range A3 based on the person recognition information, the management device 30 transmits to the vehicle 10 an instruction to reduce the light amount of the headlights 12 (light amount reduction instruction). When the light amount reduction instruction is an instruction to turn off the headlights 12, the vehicle 10 that has received the instruction turns off the headlights 12 (B1: Headlights OFF). On the other hand, when the light amount reduction instruction is an instruction to reduce the light amount without turning off the headlights 12, the vehicle 10 that has received the instruction reduces the light amount of the headlights 12 by a light amount according to the instruction (B2: Reduce Light Amount of Headlights).

Moreover, when the estimated moving direction DR2 does not indicate that a person approaches the illumination range A1 (for example, a pedestrian 54 in FIG. 4), that is, when the face of the person is basically not facing the illumination range A1, the management device 30 does not transmit to the vehicle 10 the instruction to reduce the light amount of the headlights 12. As a result, even when the pedestrian 54 is within the determination range A3 as shown in FIG. 4, the reduction in the light amount of the headlights 12 (including the turn-off of the headlights 12) is not performed.

As described above, according to the third control example, when the estimated moving direction DR2 indicates that a person approaches the illumination range A1, the instruction to reduce the light amount of the headlights 12 is transmitted to the vehicle 10 in response to the detection of the entry of the person into the determination range A3 based on the person recognition information. This makes it possible to consider the presence of the person who is highly likely to enter the illumination range A1, and to reduce an unnecessary reduction in the light amount of the headlights 12 while more reliably reducing glare to the person due to the illumination light of the vehicle 10.

2-4. Fourth Control Example

The first control example described above may be executed with a fourth control example described below instead of the second and third control examples or together with at least one of the second and third control examples.

Figure 5:
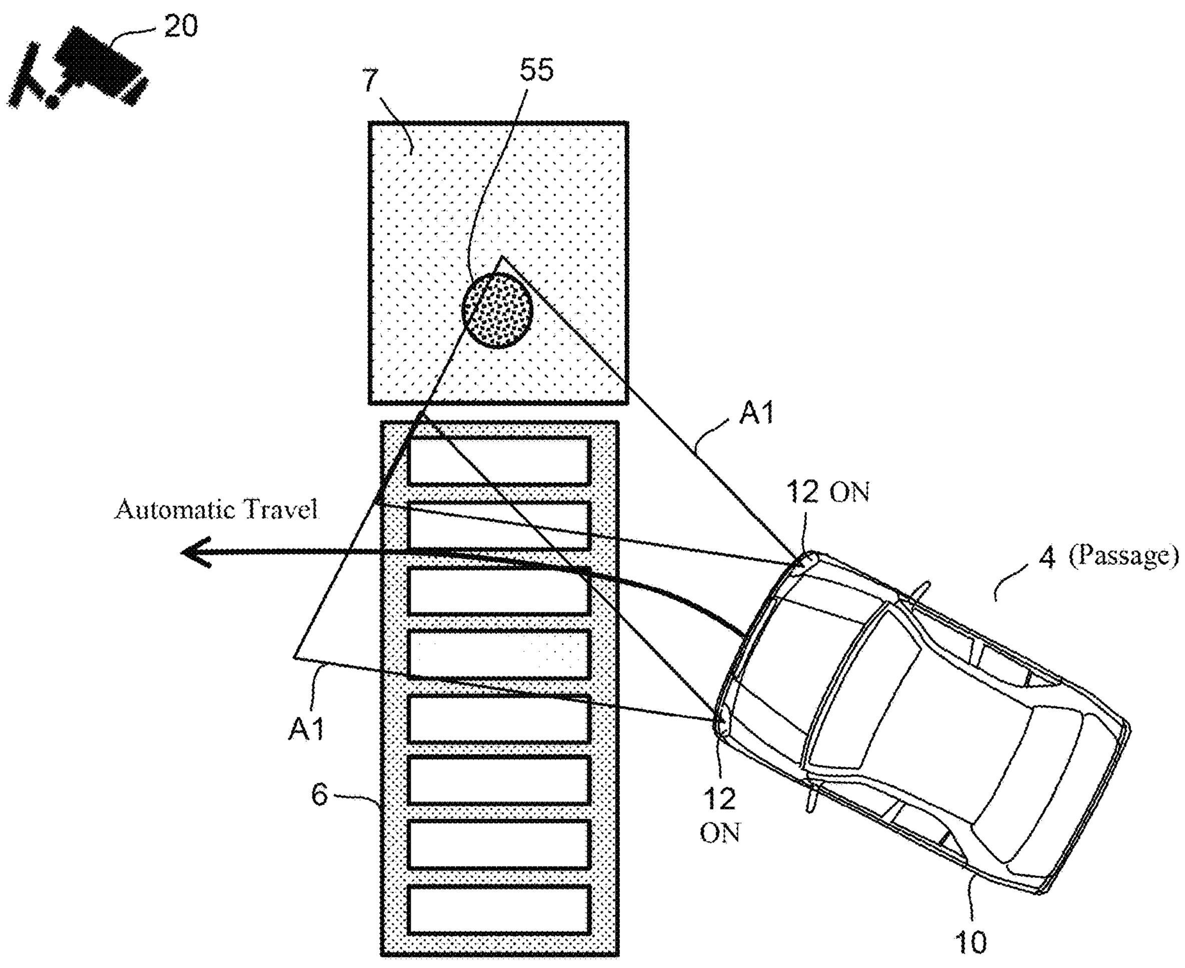
FIG. 5 shows a scene in which a vehicle passes near a place where a pedestrian stands on a slope.

The designated area, such as a parking lot, may have a plurality of floors. Also, the designated area having a plurality of floors may have a slope for a pedestrian to move between the floors. FIG. 5 shows a scene in which the vehicle 10 passes near a place where a pedestrian 55 stands on a slope 7. There is a difference in height between the passage 4 on which the vehicle 10 is automatically traveling and the slope 7 on which the pedestrian 55 is standing.

If the slope 7 is lower than the passage 4, when the pedestrian 55 enters the illumination range A1 when viewed from above as shown in FIG. 5, the illumination light of the headlights 12 may strongly illuminate the face of the pedestrian 55. As a result, the illumination light may dazzle the pedestrian 55 as compared to an example in which there is no difference in height between the vehicle 10 and the pedestrian 55. On the other hand, if the slope 7 is higher than the passage 4, even when the pedestrian 55 is within the illumination range A1 when viewed from above, the illumination light does not dazzle the pedestrian 55 or is less likely to dazzle the pedestrian 55.

Accordingly, in the fourth control example, the management device 30 acquires a vertical position information of each of a person and the vehicle 10 using, for example, slope information of the designated area together with the person recognition information and the position information of the vehicle 10. A spatial range specified in three dimensions (i.e., illumination space) is used as the illumination range A1. Then, the management device 30 executes a process of three dimensionally detecting the pedestrian 55 present in the three dimensionally specified illumination range A1 based on the person recognition information and the vertical position information.

Then, the management device 30 transmits to the vehicle 10 an instruction to reduce the light amount of the headlights 12 (including turning off the headlights 12) in response to detection of the pedestrian 55 present in the three dimensionally specified illumination range A1. More specifically, the vertical position information may include information on the face position of the pedestrian 55 obtained by analyzing an image captured by the infrastructure sensor 20. The management device 30 may transmit to the vehicle 10 an instruction to reduce the light amount of the headlights 12 (including turning off the headlights 12) in response to detection of the face position being present in the illumination range A1.

As described above, according to the fourth control example, whether or not the light amount of the headlights 12 needs to be reduced can be more appropriately determined by considering the vertical position of the person, such as the pedestrian 55, with respect to the illumination light of the headlights 12. As a result, it is possible to reduce glare to the person due to the illumination light of the vehicle 10 and to reduce an unnecessary reduction in the light amount, as compared to an example in which there is no difference in height between the vehicle 10 and the person.

2-5. Fifth Control Example

The first control example described above may be executed with a fifth control example described below instead of the second to fourth control examples or together with at least one of the second to fourth control examples.

Figure 6:
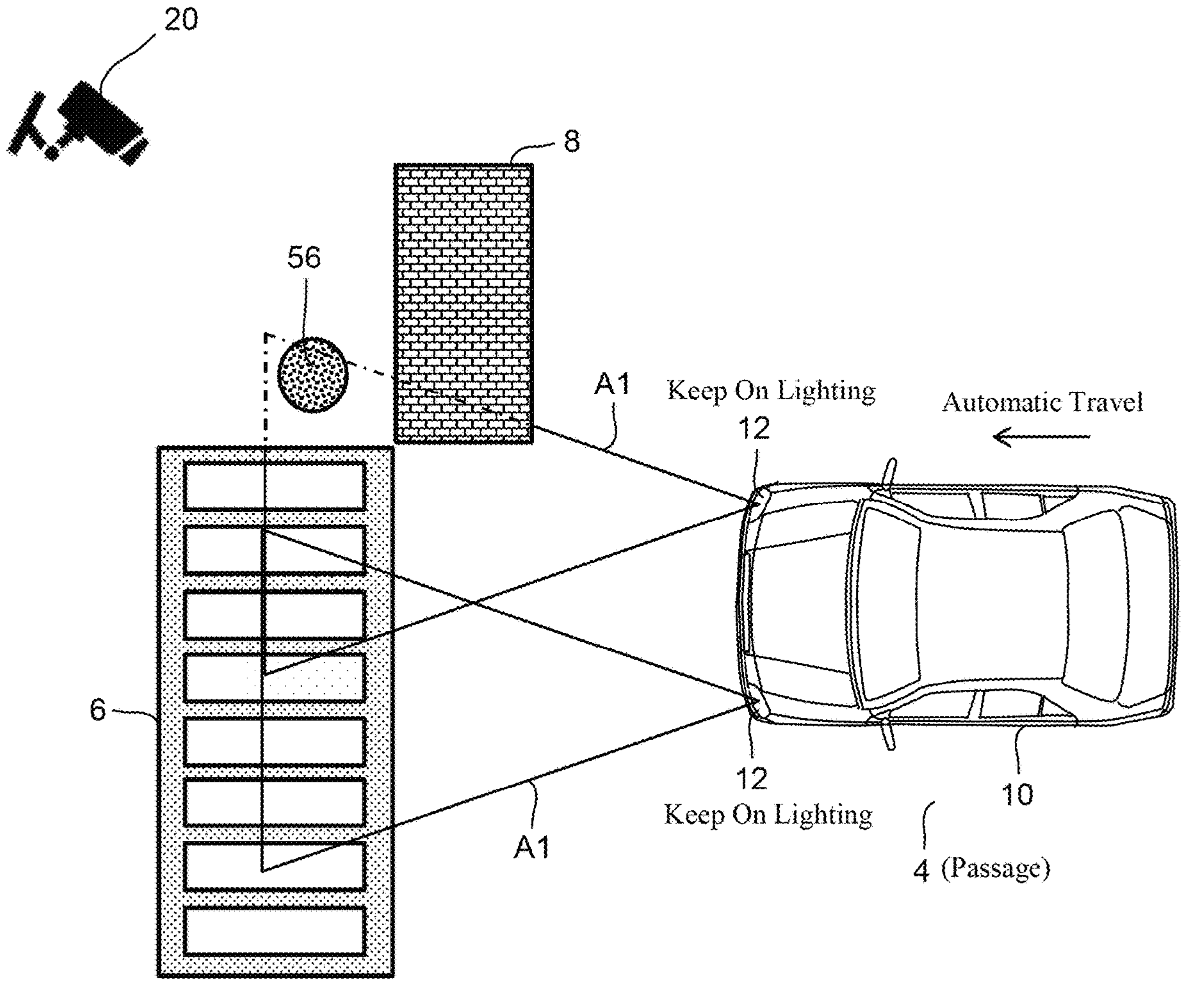
FIG. 6 shows a scene in which a person is present behind an obstacle when viewed from a vehicle.

FIG. 6 shows a scene in which a person is present behind an obstacle 8 when viewed from the vehicle 10. In the automatic travel management system 100, the infrastructure sensor 20 is used to recognize a person (for example, a pedestrian, or a person on another vehicle). Therefore, it is possible to detect a person, such as a pedestrian 56, hidden by the obstacle 8 (for example, a pillar), which cannot be detected by a recognition sensor, such as a camera, mounted on the vehicle 10. On the other hand, when the pedestrian 56 is hidden by the obstacle 8 when viewed from the vehicle 10, the pedestrian 56 is not or hardly affected by the illumination light of the vehicle 10. Therefore, even when the pedestrian 56 is within the illumination range A1 as shown in FIG. 6, the light amount of the headlights 12 may not be reduced, or the necessity of reducing the light amount is low.

Accordingly, in the fifth control example, if the obstacle 8 interposed between the person and the vehicle 10 is detected by the infrastructure sensor 20, the management device 30 does not transmit to the vehicle 10 the instruction to reduce the light amount of the headlights 12 even in a situation where a person is present in the illumination range A1 if there is no obstacle 8 between the person such as the pedestrian 56 and the vehicle 10. As a result, in the automatic travel management system 100 that uses the infrastructure sensor 20 for the lighting control in the designated area, it is possible to reduce an unnecessary reduction in the light amount of the headlights 12. In addition, information on obstacles such as the obstacle 8 (for example, the position and shape of each obstacle) is stored in the memory device 36.

In addition, the fifth control example may be combined with the third control example as follows. That is, when the moving direction DR2 of a person hidden by the obstacle 8 indicates that the person approaches the illumination range A1, the management device 30 may transmit the instruction to the vehicle 10 to reduce the light amount of the headlights 12 in response to the detection of the entry of the person into the determination range A3 based on the person recognition information. Unlike the automatic travel management system 100, in an example in which a recognition sensor, such as a camera, mounted on the vehicle 10 is used, the person cannot be recognized until the person has jumped out from behind the obstacle 8 to the passage 4. Therefore, the timing of reducing the light amount of the headlights 12 is delayed. In contrast, the use of the infrastructure sensor 20 makes it possible to reduce the light amount of the headlights 12 before the person jumps out from behind the obstacle 8.

2-6. Other Various Control Examples

The first control example described above may be executed with at least one of the following various control examples instead of the second to fifth control examples or together with at least one of the second to fifth control examples.

When detecting a person present in the illumination range A1 (more specifically, the total range of the respective illumination ranges A1 of the left and right headlights 12) based on the person recognition information, the management device 30 may determine whether the person is in the front right or the front left of the vehicle 10 based on the person recognition information. Then, the management device 30 may transmit to the vehicle 10 an instruction to reduce the light amount of only the headlight 12 of the front right side or the front left side where the person is located. This reduction in the light amount may include turning off the headlight 12. Alternatively, the management device 30 may transmit to the vehicle 10 an instruction to greatly reduce the light amount of the headlight 12 of the front right side or the front left side where the person is located, as compared to the light amount of the headlight 12 of the front right side or the front left side where the person is not located. This reduction in the light amount may include turning off the headlight 12. According to this control example, the reduction in the light amount of the headlights 12 for reducing the glare to the person can be reduced to the minimum necessary.

Moreover, the illumination range A1 of the headlights 12 used for detecting a person may be specified for each of the left and right headlights 12. That is, the management device 30 may perform a process of detecting a person present in the illumination range A1 for each of the left and right headlights 12. Then, the management device 30 may transmit an instruction to the vehicle 10 to reduce the light amount of a headlight 12 corresponding to the illumination range A1 in which the person is detected. This reduction in the light amount may include turning off the headlight 12. That is, the reduction in the light amount of the headlight 12 in response to the detection of a person present in the illumination range A1 may be performed individually for each of the left and right headlights 12. Even with this control example, the reduction in the light amount of the headlights 12 for reducing the glare to the person can be reduced to the necessary minimum.

What is claimed is:

1. An automatic travel management device for managing automatic travel of a vehicle in a designated area, comprising:

a communication device configured to communicate with each of the vehicle and a recognition sensor, wherein the recognition sensor is installed in the designated area and configured to recognize a situation in the designated area; and one or more processors, wherein the one or more processors are configured to:

when the vehicle is automatically traveling while a headlight of the vehicle is turned on, detect a first person present in an illumination range of the headlight based on person recognition information from the recognition sensor; and in response to detection of the first person, execute a light amount reduction process of transmitting, to the vehicle, an instruction to reduce light amount of the headlight, the instruction by the light amount reduction process is to turn off the headlight, and when the vehicle is automatically traveling while the headlight is turned off in accordance with the light amount reduction process and a clearance light of the vehicle is turned on, the one or more processors transmit, to the vehicle, an instruction to turn off the clearance light and stop traveling the vehicle in response to detection of a second person who is present on a travel route ahead of the vehicle and within a designated distance from the vehicle based on the person recognition information.

2. The automatic travel management device according to claim 1, wherein when detecting that the first person has moved out of the illumination range based on the person recognition information, the one or more processors transmit, to the vehicle, an instruction to return the light amount of the headlight to a light amount before the reduction by the light amount reduction process.

3. The automatic travel management device according to claim 1, wherein the one or more processors transmit, to the vehicle, an instruction to turn on the headlight and resume traveling the vehicle in response to detection of movement of the second person to outside of the travel route based on the person recognition information.

4. The automatic travel management device according to claim 1, wherein the light amount reduction process includes:

estimating a moving direction of a third person based on the person recognition information; and when the estimated moving direction indicates that the third person approaches the illumination range, transmitting, to the vehicle, an instruction to reduce the light amount of the headlight in response to detection of entry of the third person into a determination range greater than the illumination range based on the person recognition information.

5. An automatic travel management device for managing automatic travel of a vehicle in a designated area, comprising:

a communication device configured to communicate with each of the vehicle and a recognition sensor, wherein the recognition sensor is installed in the designated area and configured to recognize a situation in the designated area; and one or more processors, wherein the one or more processors are configured to:

when the vehicle is automatically traveling while a headlight of the vehicle is turned on, detect a first person present in an illumination range of the headlight based on person recognition information from the recognition sensor; and in response to detection of the first person, execute a light amount reduction process of transmitting, to the vehicle, an instruction to reduce light amount of the headlight, and the light amount reduction process includes:

estimating a moving direction of a third person based on the person recognition information; and when the estimated moving direction indicates that the third person approaches the illumination range, transmitting, to the vehicle, an instruction to reduce the light amount of the headlight in response to detection of entry of the third person into a determination range greater than the illumination range based on the person recognition information.

* * * * *